(12) United States Patent
Xie et al.

(10) Patent No.: US 11,879,496 B2
(45) Date of Patent: Jan. 23, 2024

(54) SHIPPING COMPONENT AND ELECTRONIC DEVICE

(71) Applicant: BEIJING XIAOMI MOBILE SOFTWARE CO., LTD., Beijing (CN)

(72) Inventors: Yingchun Xie, Beijing (CN); Ruihua Zhao, Beijing (CN); Ming Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 800 days.

(21) Appl. No.: 16/686,376

(22) Filed: Nov. 18, 2019

(65) Prior Publication Data

US 2021/0079948 A1 Mar. 18, 2021

(30) Foreign Application Priority Data

Sep. 12, 2019 (CN) .......................... 201921531586.9

(51) Int. Cl.
*F16B 43/02* (2006.01)
*D06F 39/00* (2020.01)

(52) U.S. Cl.
CPC .......... *F16B 43/025* (2013.01); *D06F 39/001* (2013.01)

(58) Field of Classification Search
CPC ...... F16B 43/025; F16B 45/00; D06F 39/001; F16L 3/13
USPC ................................................. 411/400, 401
See application file for complete search history.

(56) References Cited

U.S. PATENT DOCUMENTS

| 3,023,989 | A | | 3/1962 | White |
| 3,246,076 | A | | 4/1966 | Stoneburner |
| 3,430,903 | A | | 3/1969 | Mathes |
| 4,991,801 | A | * | 2/1991 | Trumbull ................ F16L 3/221 248/62 |

(Continued)

FOREIGN PATENT DOCUMENTS

DE 202007000968 U1 5/2008
EP 1 939 346 A1 * 7/2008

(Continued)

OTHER PUBLICATIONS

European Search Report in the European application No. 19211395.9, dated Jun. 23, 2020.

*Primary Examiner* — Flemming Saether
(74) *Attorney, Agent, or Firm* — SYNCODA LLC; Feng Ma (57) ABSTRACT

An electronic device includes a fixed component, a removable component removably connected to the fixed component, and a cable. The shipping component includes a locking component, a wire clamping component sleeved on the locking component, and a fixing component. The wire clamping component is provided with a wire clamping part for clamping and locking the cable. The locking component may penetrate through the fixed component and be locked and connected to the removable component, and the fixing component may limit the distance between the fixed component and the removable component. The removable component may be locked and connected to the fixed component by the shipping component, the cable of the electronic device is synchronously clamped to the shipping component, and the cable cannot be used and electrified when the shipping component is not removed.

9 Claims, 5 Drawing Sheets

(56) References Cited

U.S. PATENT DOCUMENTS

| | | | | |
|---|---|---|---|---|
| 5,055,056 A * | 10/1991 | Auclair | ............ | H01R 4/646 |
| | | | | 439/98 |
| 6,708,931 B2 * | 3/2004 | Miura | ............ | F16B 37/00 |
| | | | | 248/74.1 |
| 7,269,980 B2 * | 9/2007 | Kim | ............ | D06F 39/001 |
| | | | | 68/3 R |
| 7,410,137 B2 * | 8/2008 | Diggle | ............ | E06C 1/34 |
| | | | | 411/401 |
| 7,441,420 B2 * | 10/2008 | Kim | ............ | D06F 39/001 |
| | | | | 68/3 R |
| 7,475,572 B2 * | 1/2009 | Lappoehn | ............ | D06F 39/001 |
| | | | | 68/3 R |
| 9,279,210 B2 * | 3/2016 | Perini | ............ | D06F 39/001 |
| 9,383,041 B2 * | 7/2016 | Kanie | ............ | F16L 3/1218 |
| 10,584,437 B2 * | 3/2020 | Lee | ............ | D06F 39/001 |
| 10,837,136 B2 * | 11/2020 | Rineer | ............ | B65D 85/68 |
| 11,198,967 B2 * | 12/2021 | Pacho Millán | ............ | D06F 39/001 |
| 2009/0074535 A1 * | 3/2009 | Roberts | ............ | F16B 21/09 |
| | | | | 411/166 |
| 2021/0198830 A1 * | 7/2021 | Chun | ............ | D06F 37/22 |

FOREIGN PATENT DOCUMENTS

| | | | |
|---|---|---|---|
| FR | 2528527 A1 | | 12/1983 |
| FR | 2653183 A1 | | 4/1991 |
| GB | 1512530 A | | 6/1978 |
| WO | WO 2010/040658 | * | 4/2010 |

\* cited by examiner

SHIPPING COMPONENT AND ELECTRONIC DEVICE

CROSS-REFERENCE TO RELATED APPLICATION

This application claims priority to Chinese Patent Application 201921531586.9 filed on Sep. 12, 2019, the disclosure of which is hereby incorporated by reference in its entirety.

BACKGROUND

In a transportation or moving process, a removable part of an electronic device often need to be fixed so as to avoid impact between the removable part and a fixed part in the transportation or moving process, and further avoid the malfunction of the removable part. For example, in the process of moving a washing machine, a drum needs to be fixed to a rack and then moved or transported. In related technologies, the removable part is fixed to the fixed part by transportation components, and then, the whole device may be transported or moved.

SUMMARY

The disclosure is related generally to the technical fields of connecting devices, and particularly to a shipping component and an electronic device.

According to the first aspect of embodiments of the disclosure, a shipping component is provided and applicable to movement of an electronic device. The electronic device includes a fixed component, a removable component removably connected to the fixed component, and a cable. The shipping component includes a locking component, a wire clamping component sleeved on the locking component, and a fixing component. The wire clamping component is provided with a wire clamping part, the wire clamping part is configured to clamp and lock the cable, the locking component is configured to penetrate through the fixed component and to be locked and connected to the removable component, and the fixing component is configured to limit the distance between the fixed component and the removable component.

According to the second aspect of embodiments of the disclosure, an electronic device includes a fixed component, a removable component removably connected to the fixed component, a cable, and the above-mentioned shipping component. The cable may be clamped at the wire clamping part, and the shipping component may penetrate through the fixed component and may be locked and connected to the removable component to enable the removable component to be fixed to the fixed component.

It should be understood that the above general description and the following detailed description are merely exemplary and explanatory, but do not limit the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are for the purpose of describing specific embodiments only, and are not intended to limit the disclosure. The singular forms "a" "the" and "this" used in the disclosure and the appended claims may also include plural forms unless the contexts clearly indicate other meanings. It should also be understood that the term "and/or" used herein refers to and includes any and all possible combinations of one or more of associated listed items.

It should be understood that although the terms "first," "second," and "third" may be adopted in the disclosure to describe various information, which should not be limited to these terms. These terms are only used to distinguish the same type of information from each other. In some embodiments, the first information may also be referred to as the second information without departing from the scope of the disclosure. Similarly, the second information may also be referred to as the first information. Depending on the context, the word "if" as used herein may be interpreted as "when" or "while" or "in response to determine."

Users not familiar with the transportation requirements of the electronic device may neglect the instructions in the use of the manual and electrify the electronic device without removing the transportation components, resulting in that the removable part is forcibly separated from the fixed part, the removable part is displaced, the running noise is large, and even the electronic device is damaged.

Figure 1:
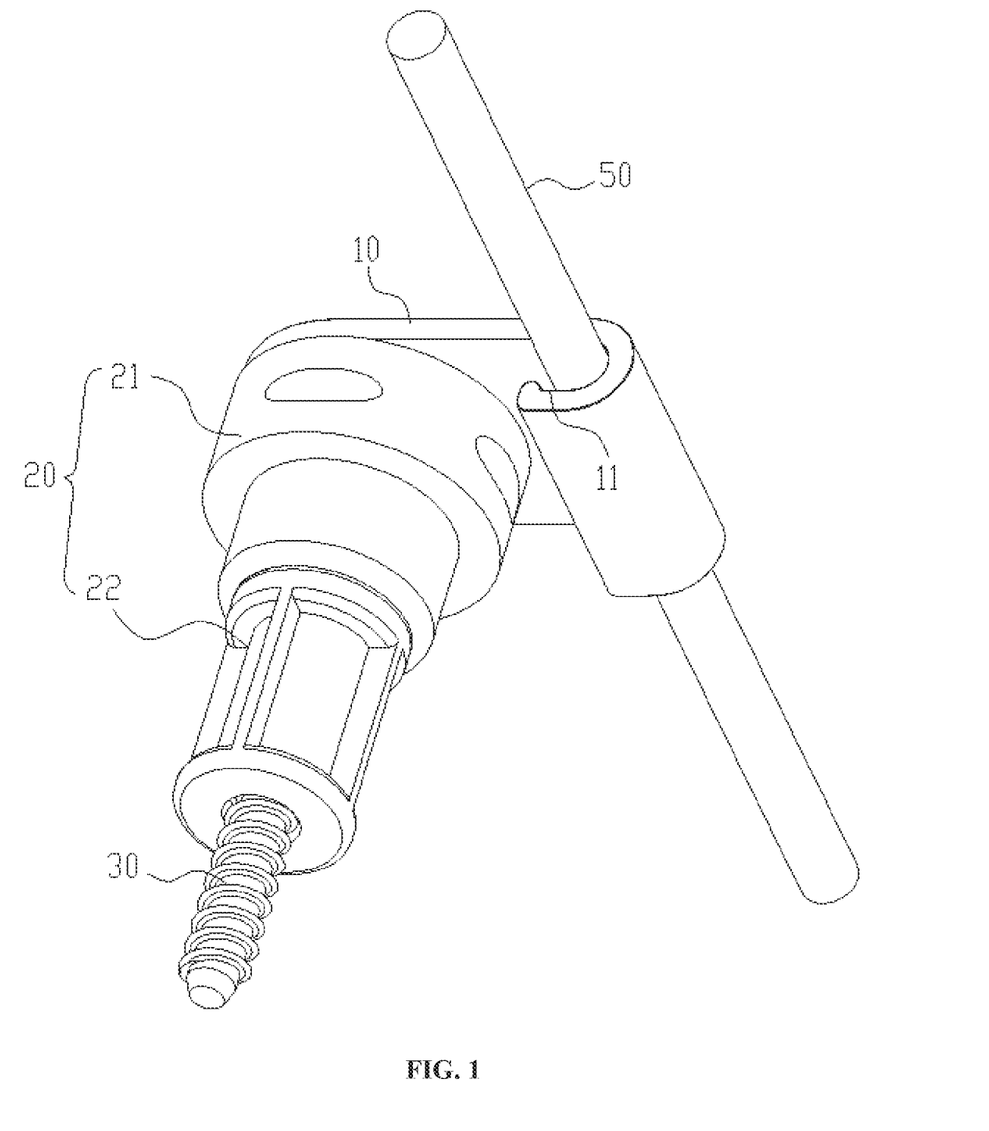
FIG. 1 is a schematic diagram of a shipping component according to some embodiments.
Figure 2:
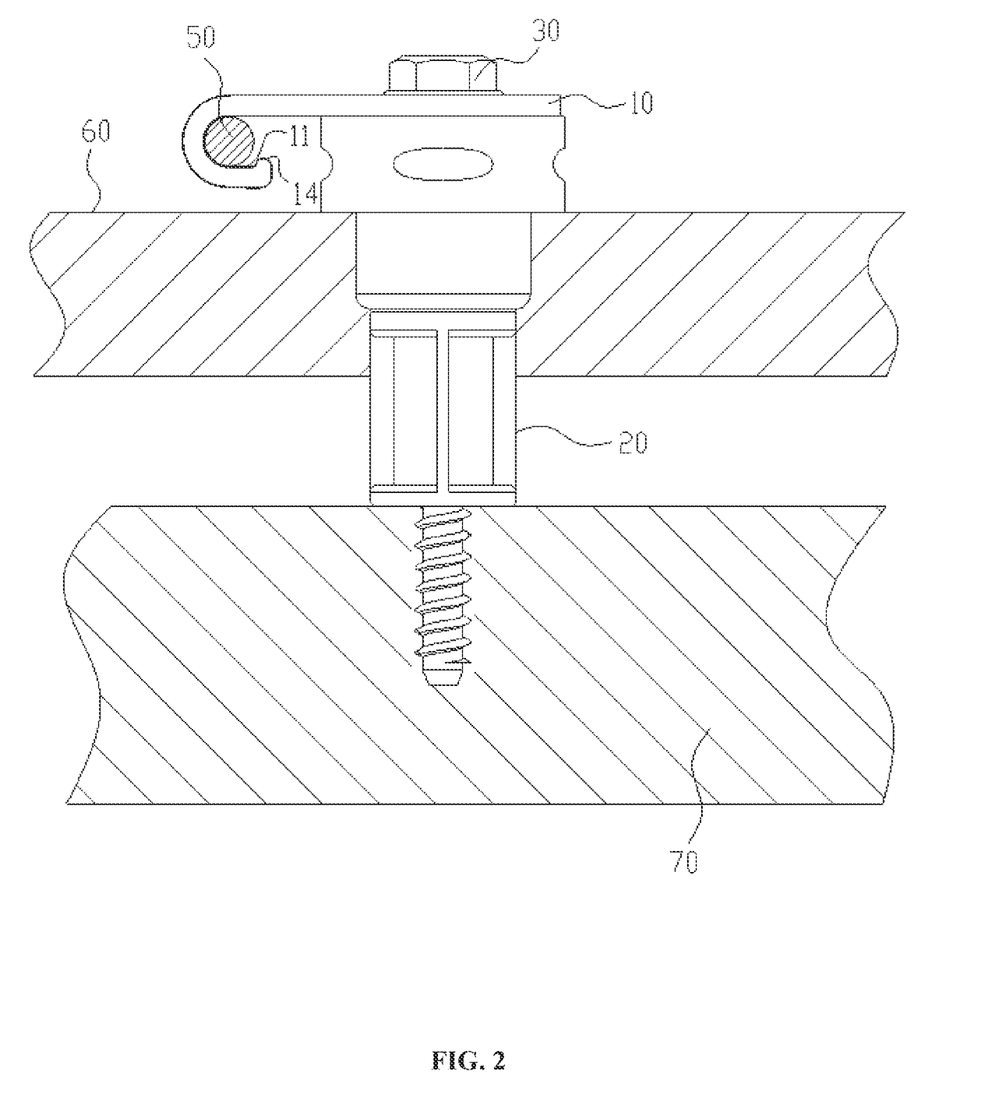
FIG. 2 is a schematic diagram of a shipping component applied to an electronic device according to some embodiments.

As shown in FIG. 1 and FIG. 2, a shipping component is used for movement of an electronic device. The electronic device may include: a fixed component 60; a removable component 70 removably connected to the fixed component 60; and a cable 50. The shipping component may include a locking component 30, a wire clamping component 10 sleeved on the locking component 30, and a fixing component 20. The wire clamping component 10 may be provided with a wire clamping part 11. The wire clamping part 11 is configured to clamp and lock the cable 50, the locking component 30 is configured to penetrate through the fixed component 60 and to be locked and connected to the removable component 70, and the fixing component 20 is configured to limit the distance between the fixed component 60 and the removable component 70.

The removable component 70 may be assembled on the fixed component 60 and may move relative to the fixed component 60. For example, the removable component 70 may rotate and swing relative to the fixed component 60. In some embodiments, the electronic device may be a washing machine, a refrigerator and other electronic devices. A washing machine is taken as an example for exemplary description. The removable component 70 may be a drum, the fixed component 60 may be a rack, and the cable 50 may be a power line. In a moving process of the washing machine, the power line may be clamped to the wire clamping component 10, the shipping component may penetrate through a locking hole in the rack, and the locking component 30 may be locked and connected to a locking part of the drum. The fixing component 20 may limit the distance between the drum and the rack and maintain the distance between the drum and the rack, so that a good fixing effect can be got.

The removable component 70 may be locked and connected to the fixed component 60 by the shipping component, and the cable 50 of the electronic device may be synchronously clamped to the shipping component. The cable 50 cannot be used and electrified when the shipping component is not removed, thereby avoiding the damage to the electronic device caused by user accidental operation and improving the user experience.

Figure 3:
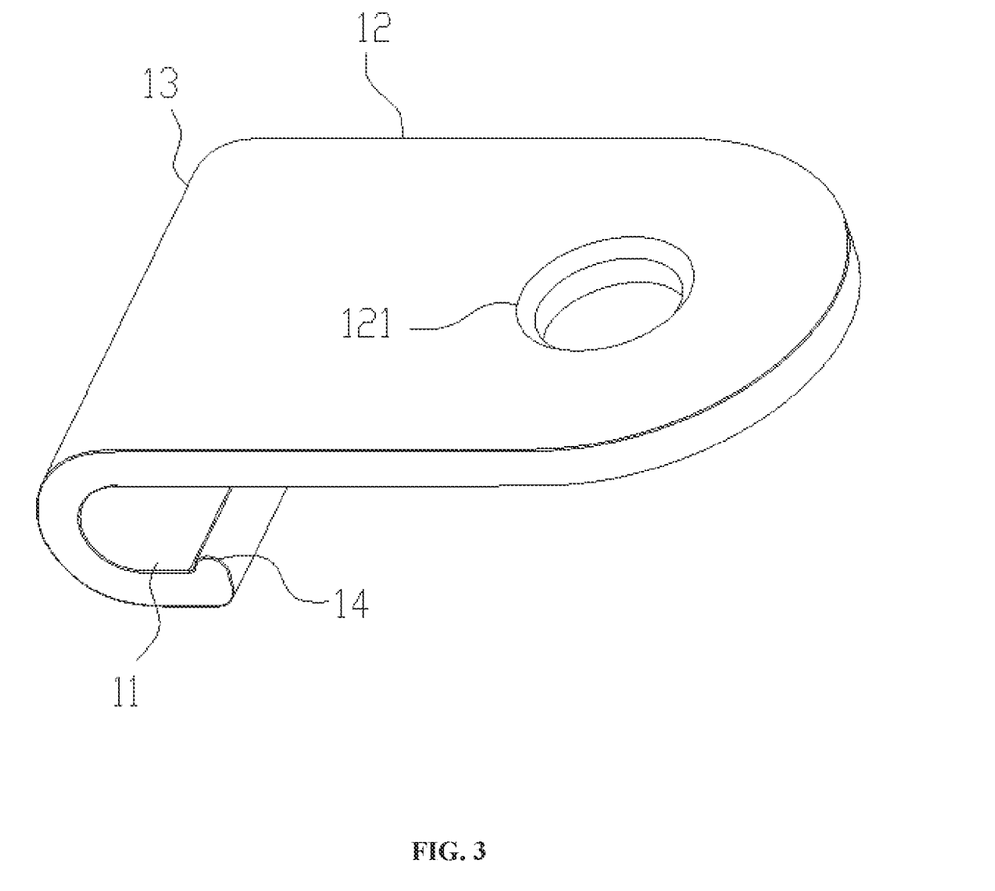
FIG. 3 is an enlarged schematic diagram of a wire clamping component according to some embodiments.

As shown in FIG. 1 and FIG. 3, the wire clamping component 10 may include a connecting body 12 and a wire locking body 13. The connecting body 12 may be provided with a mounting hole 121, the locking component 30 may penetrate through the mounting hole 121 and abut against one side of the connecting body 12, the fixing component 20 may abut against the other side of the connecting body 12, and the wire clamping part 11 may be disposed on the wire locking body 13.

The connecting body 12 may intersect with the wire locking body 13. In some embodiments, the connecting body 12 may be integrated with the wire locking body 13. In some embodiments, the connecting body 12 and the wire locking body 13 may be detachably connected. For example, the connecting body 12 and the wire locking body 13 may be connected by a fastener or connected in an inserted mode. The connecting body 12 is configured to be connected to the locking component 30, so that the wire clamping component 10 may be limited between the locking component 30 and the fixing component 20.

The mounting hole 121 may penetrate through the connecting body 12 and may be matched with the cross section of the locking component 30. In some embodiments, the mounting hole 121 may be in clearance fit with the connecting body 12. One side of the connecting body 12 may be tightened and limited by an end of the locking component 30. The size of the cross section of the end of the locking component 30 may be greater than the size of the mounting hole 121, so that the locking component 30 may tension the connecting body 12 in a connecting process. The other side of the connecting body 12 may abut against the fixing component 20 to transfer a pre-tightening force on the connecting body 12 to the fixing component 20 so as to limit the assembly position of the fixing component 20, so that a good fixing effect can be got. The wire clamping component 10 may be in plane fit with the fixing component 20 so as to improve the flatness of the combined wire clamping component 10 and fixing component 20 as well as the comprehensiveness of tension transfer of the locking component 30.

The wire locking body 13 may protrude along the radial direction of the mounting hole 121, so that the wire clamping part 11 may be clamped with the cable 50 and may be spaced apart from the locking component 30. The locking component 30 may have enough mounting space, thereby improving the convenience of assembling the shipping component.

The wire clamping part 11 may be disposed on the wire locking body 13 and configured to lock the linear cable 50. In some embodiments, the wire clamping part 11 may be formed by bending the wire locking body 13. The wire locking body 13 may be constructed to have a bent platy structure, and the wire locking body 13 may be partially bent to form a groove-shaped wire clamping part 11. For example, a tail end of the wire locking body 13 may be bent to form a groove space, the groove space may form the wire clamping part 11, and the cable 50 may be inserted along the groove of the wire clamping part 11 and limited in the wire clamping part 11. In some embodiments, a groove width of the wire clamping part 11 may be less than or equal to a width of the cable 50. In some embodiments, the wire locking body 13 may be elastically deformed partially to clamp the cable 50.

In some embodiments, the wire clamping part 11 may be a notch formed in the wire locking body 13. The wire clamping part 11 may be constructed to have a notch-shaped groove structure, and the wire clamping part 11 may be clamped in the notch to limit an activity space of the cable 50. For example, the notch may be constructed to have a "U" or "L" like shape or other notch structures. When the cable 50 is clamped at the wire clamping part 11, the cable 50 may be not easily separated from the wire clamping part 11, so that a good limiting effect is got.

The cable 50 may be clamped at the wire clamping part 11 and limited by the wire clamping part 11, and the groove direction of the wire clamping part 11 may be designed according to requirements. In some embodiments, the opening direction of the wire clamping part 11 may be parallel to an axis of the locking component 30 and located on one side of an assembly end (connected to a tool) of the locking component 30. In some embodiments, the opening direction of the wire clamping part 11 may be along with the radial direction of the locking component 30, so that the cable 50 may be conveniently clamped at the wire clamping part 11.

Figure 4:
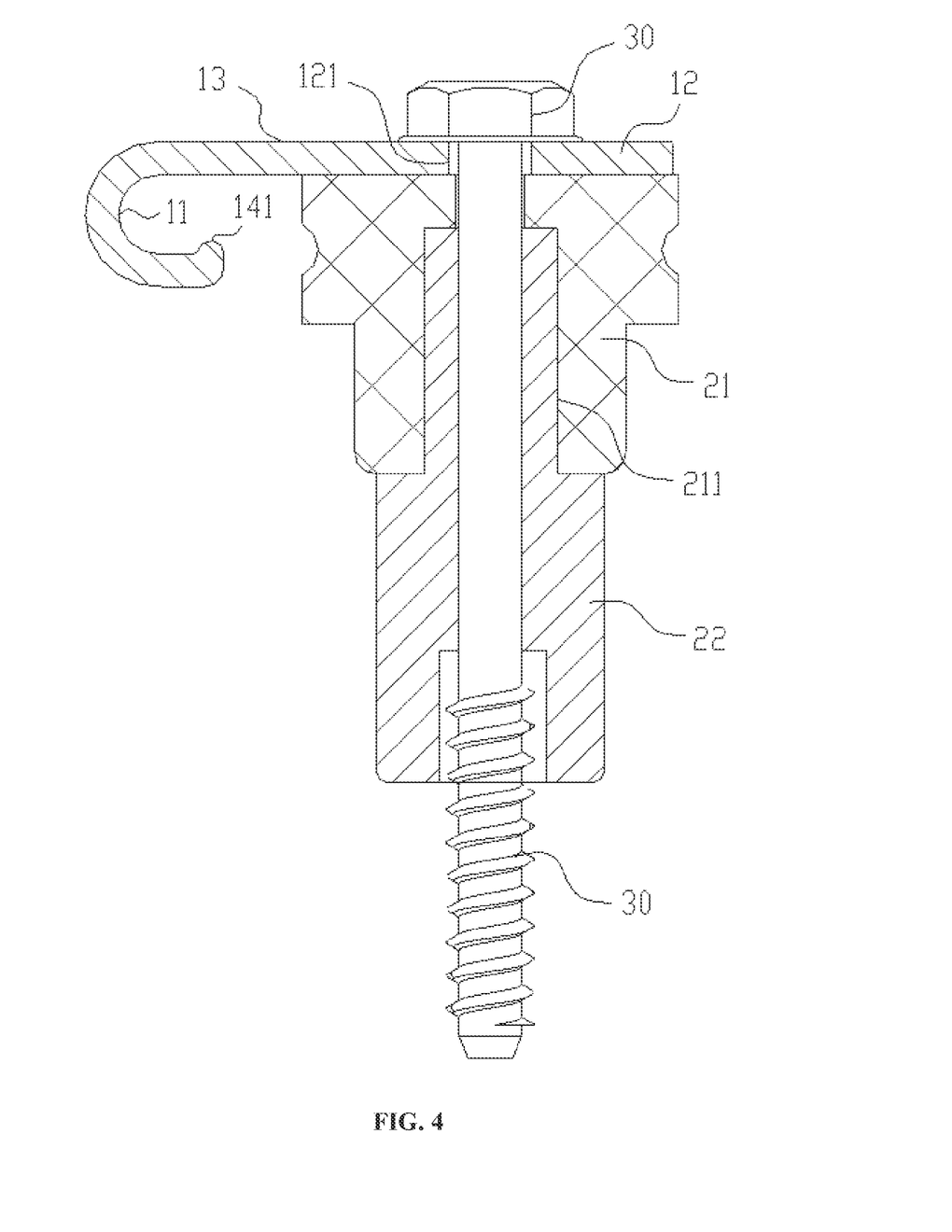
FIG. 4 is a sectional schematic diagram of a shipping component according to some embodiments.

As shown in FIG. 2 and FIG. 4, in an embodiment, the opening of the wire clamping part 11 may be on one side of the fixing component 20. When the shipping component is assembled on the fixed component 60 of the electronic device, the wire clamping component 10 may be close to the surface of the fixed component 60. The opening of the wire clamping part 11 may face the surface of the fixed component 60, so that the cable 50 may be limited between the wire clamping part 11 and the surface of the fixed component 60. Under the condition that the shipping component is not removed, the cable 50 cannot be removed from the fixed component 60 or electrified, thereby obtaining a good linkage effect, and avoiding damage to the electronic device caused by the fact that the user forgets to remove the shipping component.

The cable 50 may be fastened from the opening of the wire clamping part 11 and may be clamped by the side wall of the wire clamping part 11, and the cable 50 and the wire clamping part 11 may be closely connected with each other. In addition, the cable 50 and the wire clamping part 11 may be in clearance fit with each other, and the cable 50 may slide relative to the wire clamping part 11 along an axial direction of itself In some embodiments, the wire clamping component 10 may include an anti-falling part 14 convexly disposed on the wire locking body 13, and the anti-falling part 14 may protrude into the wire clamping part 11. The anti-falling part 14 may be convexly disposed on the surface of the wire locking body 13 to prevent the cable 50 from separating from the opening of the wire clamping part 11 as much as possible. The anti-falling part 14 may be disposed on the surface of the inner side of the wire clamping part 11, and the cable 50 may be fastened from the opening of the wire clamping part 11 and limited at the wire clamping part 11 after overcoming the resistance from the anti-falling part 14, so that a good limiting effect is obtained.

In some embodiments, the anti-falling part 14 may be constructed as anti-falling convex ribs 141 or one or more anti-falling convex points protruding from the wire locking body 13 and distributed at intervals. The anti-falling convex ribs 141 may be arranged on an inner side wall of the wire clamping part 11 in a strip structure. Specifically, the anti-falling convex ribs 141 may be arranged at the opening of the wire clamping part 11 to reduce the size of the opening of the wire clamping part 11, thereby preventing the separation of the cable 50. The anti-falling convex points may be arranged on the inner side wall of the wire clamping part 11 in a dotted or columnar bulge structure. Specifically, the anti-falling convex points may be arranged at the opening of the wire clamping part 11 to reduce the size of the opening of the wire clamping part 11, thereby preventing the separation of the cable 50.

The fixing component 20 is configured to limit the distance between the fixed component 60 and the removable component 70. In some embodiments, the fixing component 20 may be at least partially constructed to have a rigid structure to maintain the stability of the relative position. In some embodiments, the fixing component 20 may be provided with a flexible part, and the flexible part may elastically abut against the fixed component 60 and the removable component 70 under the pre-tightening force from the locking component 30 and bring an elastic buffer effect. In addition, the fixing component 20 may be composed of a flexible part and a rigid part to maintain the rigid support limit of the fixing component 20 and achieve a buffer effect. Furthermore, the fixing component 20 may be sleeved outside the locking component 30. Correspondingly, the fixing component 20 may be provided with a through hole, the locking component 30 may be inserted in the through hole, and thus the fixing component 20 may have good force balance.

Figure 5:
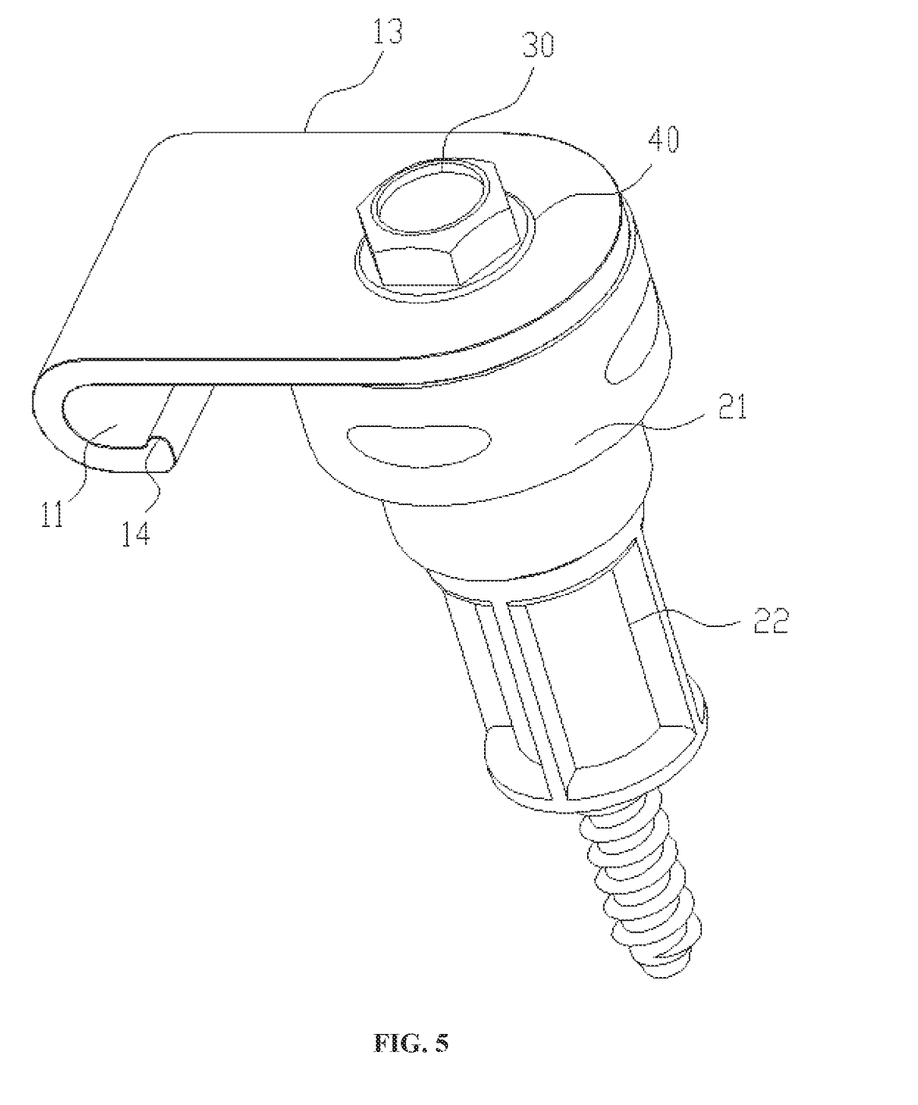
FIG. 5 is a three-dimensional schematic diagram of a shipping component according to some embodiments.

As shown in FIG. 4 and FIG. 5, in an embodiment, the fixing component 20 may include a flexible buffer component 21 and a rigid support component 22. The wire clamping component 10 and the support component 22 may be respectively located at two sides of the buffer component 21, and the locking component 30 may be inserted into the wire clamping component 10, the buffer component 21 and the support component 22.

The buffer component 21 and the support component 22 may be fit to each other and may transfer an action force smoothly. The buffer component 21 may be arranged between the support component 22 and the wire clamping component 10, so that the wire clamping component 10 and the buffer component 21 have an elastic pre-tightening force, and the distance between the wire clamping component 10 and the buffer component 21 may be stabilized. Furthermore, when the shipping component is assembled in the electronic device, an end of a rigid component may abut against the removable component 70, and the buffer component 21 may be connected to the fixed component 60 in an extruded mode, so that the distance between the fixed component 60 and the removable component 70 may be fixed and a corresponding elastic buffer force may be obtained, the local stress concentration caused by rigid connection between the removable component 70 and the fixed component 60 is avoided, and good connection reliability is obtained.

The buffer component 21 and the support component 22 may be in fitting connection with each other. For example, contact surfaces of the buffer component 21 and the support component 22 may be in plane fit or curved fit to transfer an extrusion force, so that the force transfer stability is good.

In some embodiments, the buffer component 21 and the support component 22 may be in inserted connection, so that the buffer component 21 and the support component 22 have high accuracy of matched fixing, and transfer of the action force can be smooth. For example, the buffer component 21 may be provided with an inserting hole 211, and the inserting hole 211 and a through hole may form a step hole structure. The support component 22 may form a matched step axis structure or an optical axis structure, and the support component 22 may be inserted into the inserting hole 211 and abut against the buffer component 21 to form matched fixing, so that the fixing accuracy is high. In some embodiments, the surface of the outer side of the support component 22 may be provided with anti-rotating convex ribs, and the wall of the inserting hole 211 may be correspondingly provided with an anti-rotating groove. The support component 22 may be inserted in the inserting hole 211, and the anti-rotating convex ribs may be matched and connected with the anti-rotating groove to define the accuracy of the matched fixing between the support component 22 and the buffer component 21. In some embodiments, the matched parts of the buffer component 21 and the support component 22 may be constructed as complementary inserting structures, that is, one of the buffer component 21 and the support component 22 may be provided with an groove, and the other one may be provided with a matched projection, so that the buffer component 21 and the support component 22 may be connected in an inserted mode, the combination tightness is high, and the matching effect is good.

The locking component 30 may penetrate through the wire clamping component 10 and the fixing component 20, and may be detachably connected with the removable component 70. In some embodiments, the locking component 30 may be constructed as a screw component, including a fastening part disposed at an end and a spiral part convexly disposed at a fastening part, and the fastening part may rotate under the action of a torque force to enable the spiral part to be in threaded connection to the removable component 70 until the fixing component 20 limits the distance between the removable component 70 and the fixed component 60 under the action of a pre-tightening force of the wire clamping component 10 and the locking component 30, so that the fixing accuracy is high. In some embodiments, the fastening part may be constructed to have an inner/outer hexagon bolt head structure, or the fastening part may be constructed to have a screw head structure with a cross groove.

In some embodiments, the fastening part may be directly crimped to the wire clamping component 10 to facilitate connection. In some embodiments, the shipping component also may include an adjusting component 40 sleeved on the locking component 30, and the wire clamping component 10 may be between the adjusting component 40 and the fixing component 20. The fastening part may be crimped to the adjusting component 40 and then crimped to the wire clamping component 10 through the adjusting component 40. The adjusting component 40 may be constructed as structural components, such as a gasket, to enlarge a stress area of the wire clamping component 10, so that the stress stability is good. In some embodiments, the contact surfaces of the adjusting component 40 and the wire clamping component 10 may be provided with a non-slip projection to improve the tightness of matching of the adjusting component 40 with the wire clamping component 10.

Applying the shipping component in the above embodiments to an electronic device in movement or transportation may improve the stability of the electronic device during transportation, and may ensure that a user removes the shipping component before using the electronic device. In an embodiment, the electronic device may include the fixed component 60, the removable component 70 removably connected to the fixed component 60, the cable 50, and the shipping component described in the above embodiments. The cable 50 may be clamped at the wire clamping part 11, and the shipping component may penetrate through the fixed component 60 and may be locked and connected to the removable component 70, so that the removable component 70 is fixed relative to the fixed component 60.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A shipping component, applicable to movement of an electronic device having a fixed component, a removable component removably connected to the fixed component, and a cable, the shipping component comprising:
a locking component,
a wire clamping component sleeved on the locking component, and
a fixing component,
wherein the wire clamping component is provided with a wire clamping part, the wire clamping part is configured to clamp and lock the cable, the locking component is configured to penetrate through the fixed component and to be locked and connected to the removable component, and the fixing component is configured to limit a distance between the fixed component and the removable component,
wherein the fixing component comprises a flexible buffer component and a rigid support component, the wire clamping component and the rigid support component are on two sides of the buffer component respectively, and the locking component is inserted into the wire clamping component, the buffer component and the support component,
wherein the buffer component is provided with an inserting hole, a surface of an outer side of the support component is provided with anti-rotating convex ribs, a wall of the inserting hole is provided with an anti-rotating groove matchable and connectable with the anti-rotating convex ribs, the support component is capable of being inserted into the inserting hole of the buffer component,
wherein the wire clamping component comprises a connecting body and a wire locking body, the connecting body is provided with a mounting hole, the locking component penetrates through the mounting hole and abuts against one side of the connecting body, the fixing component abuts against the other side of the connecting body, and the wire clamping part is disposed on the wire locking body, the wire locking body being capable of being elastically deformed partially to clamp the cable,
wherein the wire clamping component further comprises an anti-falling part, the anti-falling part protruding from the wire locking body and being disposed on a surface of an inner side of the wire clamping part, and
wherein the anti-falling part has at least one anti-falling convex rib or at least one anti-falling convex point protruding from the wire locking body and distributed at intervals.

2. The shipping component of claim 1, wherein the wire clamping part is formed by bending the wire locking body, or the wire clamping part is a notch formed in the wire locking body.

3. The shipping component of claim 2, wherein the shipping component further comprises an adjusting component sleeved on the locking component, and the wire clamping component is between the adjusting component and the fixing component, and wherein the adjusting component is a gasket configured to enlarge a stress area of the wire clamping component.

4. The shipping component of claim 1, wherein an opening of the wire clamping part is on one side of the fixing component.

5. The shipping component of claim 1, wherein the shipping component further comprises an adjusting component sleeved on the locking component, and the wire clamping component is between the adjusting component and the fixing component, and wherein the adjusting component is a gasket configured to enlarge a stress area of the wire clamping component.

6. An electronic device, comprising:
a fixed component, a removable component removably connected to the fixed component,
a cable, and
a shipping component comprising:
   a locking component,
   a wire clamping component sleeved on the locking component, and
   a fixing component,
   wherein the wire clamping component is provided with a wire clamping part, the wire clamping part is configured to clamp and lock the cable, the locking component is configured to penetrate through the fixed component and to be locked and connected to the removable component, and the fixing component is configured to limit a distance between the fixed component and the removable component,
   wherein the fixing component comprises a flexible buffer component and a rigid support component, the wire clamping component and the rigid support component are on two sides of the buffer component respectively, and the locking component is inserted into the wire clamping component, the buffer component and the support component,
   wherein the buffer component is provided with an inserting hole, a surface of an outer side of the support component is provided with anti-rotating convex ribs, a wall of the inserting hole is provided with an anti-rotating groove matchable and connectable with the anti-rotating convex ribs, the support component is capable of being inserted into the inserting hole of the buffer component,
   wherein the wire clamping component comprises a connecting body and a wire locking body, the connecting body is provided with a mounting hole, the locking component penetrates through the mounting hole and abuts against one side of the connecting body, the fixing component abuts against the other side of the connecting body, and the wire clamping part is disposed on the wire locking body, the wire locking body being capable of being elastically deformed partially to clamp the cable,
   wherein the wire clamping component further comprises an anti-falling part, the anti-falling part protruding from the wire locking body and being disposed on a surface of an inner side of the wire clamping part, and
   wherein the anti-falling part has at least one anti-falling convex rib or at least one anti-falling convex point protruding from the wire locking body and distributed at intervals.

7. The electronic device of claim 6, wherein the wire clamping part is formed by bending the wire locking body, or the wire clamping part is a notch formed in the wire locking body.

8. The electronic device of claim 6, wherein an opening of the wire clamping part is on one side of the fixing component.

9. The electronic device of claim 6, wherein the shipping component further comprises an adjusting component sleeved on the locking component, and the wire clamping component is between the adjusting component and the fixing component, and wherein the adjusting component is a gasket configured to enlarge a stress area of the wire clamping component.

* * * * *